United States Patent
Okita et al.

Patent Number: 6,132,847
Date of Patent: Oct. 17, 2000

[54] FOAMED RUBBER EXTRUDED PRODUCT

[75] Inventors: Tomoaki Okita, Kasugai; Katsumi Nakashima, Ichinomiya; Takashi Mizushima, Nagoya; Norikazu Mayama; Hitoshi Kondo, both of Kyoto, all of Japan

[73] Assignees: Toyoda Gosei Co., Ltd., Aichi-ken; Eiwa Chemical Ind. Co., Ltd., Kyoto-fu, both of Japan

[21] Appl. No.: 09/186,881

[22] Filed: Nov. 6, 1998

[30] Foreign Application Priority Data

Nov. 6, 1997 [JP] Japan .................................. 9-303232
Oct. 14, 1998 [JP] Japan .................................. 10-291642

[51] Int. Cl.$^7$ .............................. C08J 9/06; C08K 9/04; C08L 23/16
[52] U.S. Cl. ........................... 428/159; 264/54; 428/339; 521/81; 521/140; 521/150
[58] Field of Search ................... 428/159, 339; 521/81, 140, 150; 264/54

[56] References Cited

U.S. PATENT DOCUMENTS 4,866,101  9/1989  Iwasa et al. ........................... 521/95
5,766,703  6/1998  Mori et al. ............................ 428/31

FOREIGN PATENT DOCUMENTS 9-87411  3/1997  Japan .

*Primary Examiner*—Blaine Copenheaver
*Attorney, Agent, or Firm*—Pillsbury Madison & Sutro LLP

[57] ABSTRACT

A formed rubber extruded product which is formed of a vulcanizate of a rubber blend comprising a sulfur-vulcanizable ethylene-propylene-type rubber (EPDM) as a starting rubber and a pyrolytic foaming agent. The vulcanizate has a specific gravity of from 0.9 to 1.0 and a surface roughness (RZD) of 14 micrometers or less. The rubber blend contains the pyrolytic foaming agent in the form of an inorganic powder-supported foaming agent. A particle diameter of the inorganic powder in the inorganic powder-supported foaming agent is approximately 9 micrometers or less, and a particle diameter of the pyrolytic foaming agent is approximately 8 micrometers or less. Further, crystalline PE is contained in an amount of from 6 to 30 parts per 100 parts of EPDM. The foamed rubber extruded product of the present invention can be produced by the extrusion at a high rate.

14 Claims, 3 Drawing Sheets

FOAMED RUBBER EXTRUDED PRODUCT

BACKGROUND OF THE INVENTION (1) Field of the Invention

The present invention relates to a foamed rubber extruded product formed of a vulcanizate of a rubber blend comprising a vulcanizable ethylene-propylene-type rubber (hereinafter referred to as "EPDM") as a starting rubber and a pyrolytic foaming agent.

(2) Description of Related Art

The present invention is described by taking a weather strip as an example. However, the present invention can also be applied to weather strip rubbers such as a window frame rubber and a glass Sun, automobile interior and exterior rubber products such as an opening trim and a head lamp seal, a hose and a rubber mandrel.

A door weather strip shown in FIGS. 1 and 2 has a U-shaped grip 14, which is formed of a solid rubber, having an insert 12 embedded therein, and a hollow seal 16 and a lip seal 18 which are formed of a sponge rubber.

Usually, the above-mentioned U-shaped grip 14 is formed by extrusion-molding a vulcanizate (solid rubber) of an unformed EPDM rubber blend. EPDM is excellent in weatherability and in ozone resistance and good in low-temperature properties so that it can easily satisfy the requirements of a weather strip.

In order to meet the recent requirements of a weather strip, such as low cost and light weight, it is considered that a U-shaped grip is formed by extrusion-molding a foamed rubber blend such as proposed in Japanese Patent Laid-Open No. 87,411/1997. When this foamed rubber blend is used, a foamed rubber extruded product having a specific gravity of from approximately 0.9 to 1.0 and a surface roughness (RZD) of 14 micrometers or less, a so-called finely foamed rubber extruded product, can easily be obtained. When the specific gravity is less than 0.9, a predetermined hardness and a predetermined rigidity are hardly provided, and the product cannot be a substitute for the solid rubber. RZD refers to the roughness indicated by the mean value of the heights of ten points of irregularities. Meanwhile, when it exceeds 1.0, the requirement for lowering weight is scarcely satisfied. Further, when the surface roughness (RZD) exceeds 14 micrometers, a poor appearance (poor surface roughness) is provided.

However, in the case of the foamed rubber blend containing the above-mentioned pyrolytic foaming agent, it has been found that the extrusion at a high rate brings the following problems. The high rate refers to approximately 8 m/min or more. For example, the usual extrusion rate is approximately 5 m/min (refer to [0033] in the above-mentioned Japanese Patent Laid-Open No. 87,411/1997).

(i) The surface roughness is easily increased, and a product having a specific gravity of 1.0 or less is hardly obtained (refer to Comparative Example 2').

According to the present inventors' study, this is presumably because an extrusion head pressure is relatively high (refer to FIG. 3).

(ii) When the weather strip having the finely foamed rubber portion (U-shaped grip 14) and the sponge rubber portions (hollow seal 16 and lip seal 18) as shown in FIGS. 1 and 2 is formed by the extrusion, material is returned to the initial stage of the extrusion, and the sponge rubber portion lacks a dimensional stability, so that unsatisfactory extrusion tends to occur.

The returning of the material occurs presumably because, as shown in FIG. 3, a peak value P1 of an initial extrusion head pressure of the finely foamed rubber (Comparative Example 2') is higher than a peak value P2 of an ordinary solid rubber (Comparative Example 10). [Refer to FIG. 3.]

Especially when the U-shaped grip 14 is extruded from the finely foamed rubber portion at the same time the hollow seal 16 and the lip seal 18 are extruded from the sponge rubber portions, as shown in FIGS. 1 and 2, the dimensional stability of the sponge rubber portions becomes lower than in the simultaneous extrusion from the solid rubber portion. This is because by the returning of the material of the finely foamed rubber portion, the finely foamed rubber enters into the sponge rubber portion and is extruded thereinto, with the result that a portion which is to be originally formed with the sponge rubber portion is formed with the finely foamed rubber portion instead.

SUMMARY OF THE INVENTION

It is an object of the present invention to provide a foamed rubber extruded product formed of a vulcanizate which can stably be produced by extrusion at a high rate, the vulcanizate having a specific gravity of from 0.9 to 1.0 and a surface roughness (RZD) of 14 micrometers or less.

The foamed rubber extruded product of the present invention is formed of a vulcanizate of a rubber blend comprising EPDM as a starting rubber and a pyrolytic foaming agent, the vulcanizate having a specific gravity of from 0.9 to 1.0 and a surface roughness (RZD) of 14 micrometers or less. In this product, the rubber blend contains the pyrolytic foaming agent in the form of an inorganic powder-supported foaming agent, a particle diameter of the inorganic powder in the inorganic powder-supported foaming agent being approximately 9 micrometers or less, and a particle diameter of the pyrolytic foaming agent being approximately 8 micrometers or less. Further, crystalline polyethylene as a polymer component is contained in an amount of from 8 to 25 parts by weight per 100 parts by weight of EPDM.

It is preferable that the amount of the pyrolytic foaming agent (net amount of the foaming agent: functional amount of the foaming agent) is at least 0.05 parts by weight and less than 0.7 parts by weight per 100 parts by weight of EPDM.

The rubber blend having a foaming recipe which is used in the rubber extruded product of the present invention contains an inorganic powder-supported foaming agent in which a pyrolytic foaming agent of less than a predetermined particle diameter is supported on an inorganic powder of less than a predetermined particle diameter, and it further contains polyethylene (PE) in a predetermined amount, whereby a foamed rubber extruded product in which the vulcanizate has a specific gravity of from 0.9 to 1.0 and a surface roughness (RZD) of 14 micrometers or less can be produced stably by the extrusion at a high rate as will be described later in test Examples.

Further, in the rubber blend used in the present invention, as will be described later in Examples, a head pressure at the initial stage of the extrusion is not increased (no peak is shown), and the returning of the material hardly occurs at the initial stage of the extrusion. Accordingly, even when the finely foamed rubber portion formed of the rubber blend in the present invention is extruded simultaneously with the sponge rubber portion, dimensional stability is not lost, and unsatisfactory extrusion hardly occurs.

DESCRIPTION OF PREFERRED EMBODIMENTS

The foamed rubber extruded product of the present invention is described below. The unit and the composition ratio in the following description are on the weight basis unless otherwise instructed.

(1) As EPDM which is a starting rubber (low material rubber), an ethylene-propylene-nonconjugated diene terpolymer is preferably used. The whole or a part of the propylene component may be replaced with another alpha-olefin having from 4 to 20 carbon atoms. Usually, the ethylene content is between 70 and 80% by weight.

Preferable examples of the nonconjugated diene include 5-ethylidene-2-norbornene (END), dicyclopentadiene (DCPD) and 1,4-hexadiene (1,4-HD). The content of the nonconjugated diene is adjusted such that the iodine value becomes between 5 and 25.

EPDM may be used in such an oil-extended form that a process oil is added in an amount of from 10 to 40 parts per 100 parts of EPDM in the production of a polymer. Further, a polymer alloy type formed by previously dry-blending oil-extended EPDM with crystalline polyethylene (crystalline PE) to be described later may be used.

(2) It is indispensable that the rubber blend used in the foamed rubber extruded product of the present invention is contained in the form of an inorganic powder-supported foaming agent in which a pyrolytic foaming agent is supported with (carried by) an inorganic powder (inorganic carrier), a particle diameter of the inorganic powder is approximately 9 micrometers or less (preferably between 0.1 and 7 micrometers, further preferably between 0.1 and 2 micrometers) and a particle diameter of the pyrolytic foaming agent is approximately 8 micrometers or less (preferably between 1 and 6 micrometers).

The foaming agent is contained in the form of the inorganic powder-supported foaming agent in order that the specific gravity, namely, the expansion ratio of the vulcanizate can easily be adjusted and the foaming agent is uniformly or homogeneously dispersed to stabilize the expansion ratio of each portion. At this time, the amount of the pyrolytic foaming agent in the form of the inorganic powder-supported foaming agent is usually between 2 and 50% by weight, preferably between 5 and 25% by weight.

Further, when the average particle diameter of the inorganic powder exceeds 9 micrometers and the average particle diameter of the pyrolytic foaming agent exceeds 8 micrometers, it is difficult to stably produce a product in which the vulcanizate has a specific gravity of from 0.9 to 1.0 and a surface roughness (RZD) of 14 micrometers or less by extrusion at a high rate as intended by the present invention.

Figure 4:
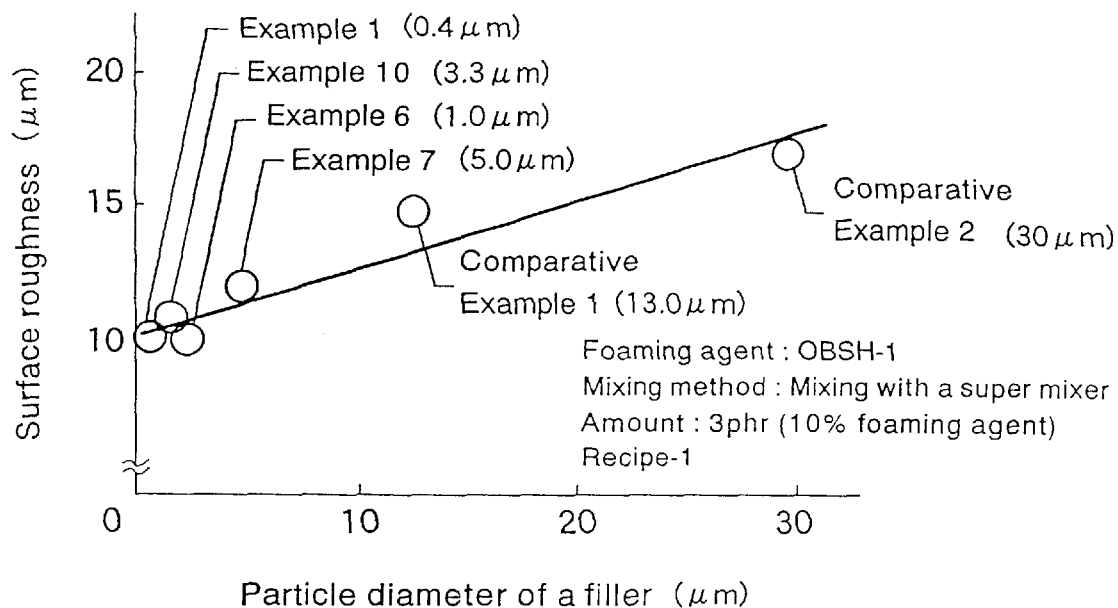
FIG. 4 is a graphical representation showing an influence of a particle diameter of an inorganic powder on a surface roughness.
Figure 5:
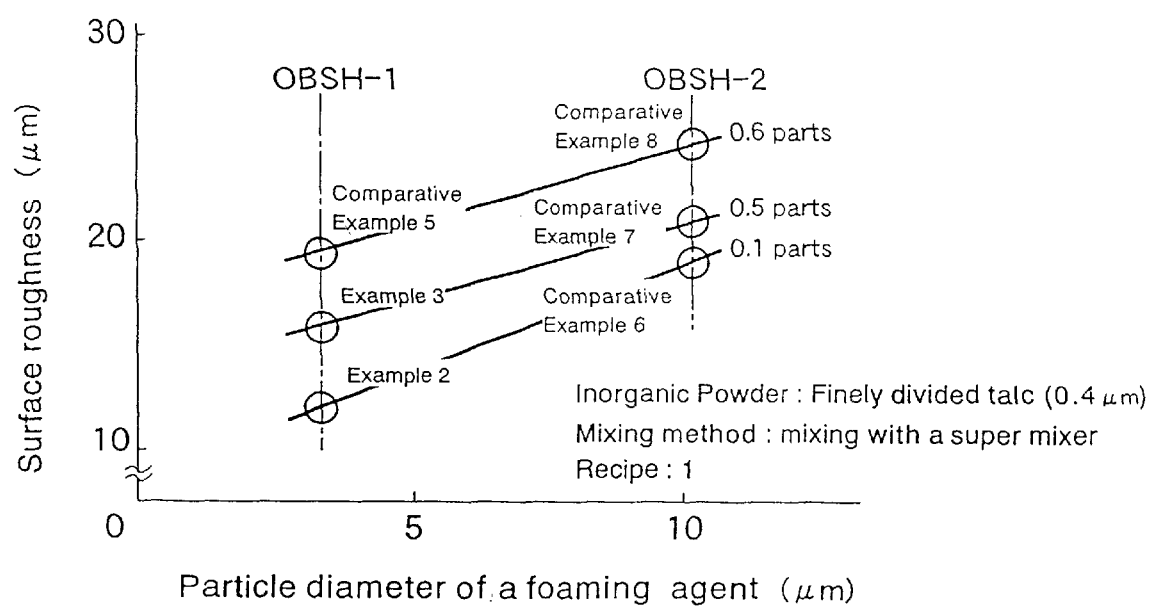
FIG. 5 is a graphical representation showing an influence of a particle diameter of a foaming agent on a surface roughness.

When the particle diameter of the inorganic powder is increased, the surface roughness tends to be increased (refer to FIG. 4) presumably because an extrusion resistance (extrusion pressure) is relatively increased. Further, when the average particle diameter of the pyrolytic forming agent is increased, the surface roughness tends to be increased (refer to FIG. 5) presumably because the degree of dispersion of the pyrolytic foaming agent is relatively decreased.

The inorganic powder is not particularly limited so far as the average particle diameter is 9 micrometers or less. Examples thereof include inorganic fillers such as finely divided talc, light calcium carbonate, heavy calcium carbonate, magnesium carbonate, zinc oxide, siliceous earth, silica, clay, talc and diatomaceous earth; and these inorganic fillers which are surface-treated with a silane coupling agent. Talc having a lubricity is preferable, and finely divided talc is especially preferable. Finely divided talc of which the average particle diameter is usually between 0.1 and 1 micrometer, preferably between 0.3 and 0.7 micrometers is used. Further, light calcium carbonate of which the average particle diameter is usually between 0.2 and 4 micrometers, preferably between 0.5 and 2 micrometers is used. Heavy calcium carbonate of which the average particle diameter is usually between 0.5 and 9 micrometers, preferably between 3 and 7 micrometers is used.

There are various foaming agents depending on a vulcanization temperature and a vulcanization method. Examples thereof include 4,4'-oxybisbenzenesulfonylhydrazide (OBSH), azobisdiformamide (ADCA), dinitrosopentamethylene tetramine (DPT), p-toluenesulfonyl hydrazide (TSH), azobis-isobutylonitrile (AZDN), and a combination of these foaming agents and auxiliaries.

Of these, the foaming agent having a pyrolysis temperature of from 150 to 170° C. is preferable, and a typical foaming agent is OBSH.

The particle diameters of the above-mentioned inorganic powder and pyrolytic foaming agent can finally become less than the average particle diameters thereof. In general, it is advisable that each average particle diameter is adjusted to 9 micrometers or less from the start of the mixing. Especially, the pyrolytic foaming agent seems likely to be partially heat-decomposed by shearing heat. Further, the lower limits of the average particle diameters of the inorganic powder and the pyrolytic foaming agent are not particularly limited. Ordinarily, from the standpoint of handling and mixing, the average particle diameter of the inorganic powder is 0.1 micrometers, and the average particle diameter of the pyrolytic foaming agent is 1 micrometer.

This inorganic powder-supported foaming agent is produced by making the material uniform through simple mixing using a super mixer. When the uniformity (homogeneity) of this foaming agent is increased, it may be produced by a mechanical particle compounding method as described in the above-mentioned Japanese Patent Laid-Open 87,411/1997 (refer to "Industrial Materials, December 1993", pp. 27–33, "Technology of Compounding and Activating Powder Materials"), as well as by an emulsion suspension method using a liquid phase reaction, a sol-gel method, a doping method or a chemical vapor deposition (CVD) method.

As a device for this mechanical particle compounding, a device described in Japanese Patent Laid-Open No. 42,728/1988 can be used preferably.

(3) It is indispensable that the blend of the present invention further comprises crystalline PE as a polymer component in an amount of from 6 to 30 parts, preferably from 8 to 25 parts, further preferably from 15 to 25 parts per 100 parts of EPDM.

Blending of crystalline PE as the polymer component makes it possible to extremely improve the surface texture (surface roughness) as compared with EPDM alone presumably because crystalline PE plasticized through the extrusion at a high rate migrates to the surface side.

When the amount of crystalline PE is less than 6 parts, it is difficult to stably produce a product in which the vulcanizate has a specific gravity of from 0.9 to 1.0 and a surface roughness (RZD) of 12 micrometers or less by the extrusion at a high rate as intended by the present invention. Meanwhile, when the amount exceeds 30 parts, low-temperature properties are deteriorated.

Especially when the amount of crystalline PE is between 10 and 25 parts (Examples 1 to 10), a foamed rubber extruded product can easily be obtained in which the vulcanizate has a specific gravity of 0.98 or less [0.96 or less when the amount of the foaming agent is 0.15 parts or more (except Example 2)] and a surface roughness (RZD) of 13 micrometers or less [12 micrometers or less extrusion rate is 10 m/min or more (except Example 4)].

This is because the surface texture (surface roughness) of the foamed rubber extruded product is improved.

(4) The rubber blend is produced in a usual manner using the above-mentioned inorganic powder-supported foaming agent.

The rubber polymer usually contains, in addition to the above-mentioned inorganic powder-supported foaming agent, additives such as a reinforcing filler (carbon black or white carbon), a plasticizer, a lubricant and a vulcanizing agent.

At this time, the amount of the inorganic powder-supported foaming agent varies depending on the expansion ratio and the amount of the foaming agent. It is usually between 0.5 and 15 parts, preferably between approximately 1 and 5 parts per 100 parts of EPDM. For the surface roughness to be rendered within the range (RZD: 14 micrometers or less) of the present invention, it is less than 0.7 parts (preferably less than 0.6 parts: refer to Example 3 and Comparative Example 5, and Example 8 and Comparative Example 4) in terms of a functional amount (net amount) of the pyrolytic foaming agent. It is more preferably less than 0.4 parts because a rubber extruded product having a lower surface roughness can easily be obtained (Examples 1, 3, 7 and 8).

On the other hand, the lower limit of the amount (net amount) of the pyrolytic foaming agent is 0.05 parts or more for obtaining the extruded product having the specific gravity of the present invention. It is preferably 0.15 parts or more because a product having a lower specific gravity can easily be obtained (Examples 1 and 2).

Recipes 1 to 3 which can be used in the present invention are shown in Table 1.

The above-mentioned rubber blend is extrusion-molded using an extruder for a window frame rubber, and then subjected to vulcanization.

At this time, the extrusion rate is between 8 and 24 m/min, preferably between 12 and 18 m/min. When the extrusion rate is too low, the desired surface roughness of the present invention is hardly provided (refer to Example 13 and Comparative Example 12). When the extrusion rate is too high, the procedure achieves insufficient vulcanization, and the post treatment such as cutting, bending or the like becomes impossible.

In the vulcanization, it is possible that a microwave heater, two hot-air heaters, or two hot-air heaters having different temperature conditions are mounted, in this order, with the microwave heater disposed between the hot-air heaters.

The vulcanization is conducted usually at from 180 to 240° C. for from 3 to 30 minutes, preferably at from 210 to 230° C. for from 5 to 20 minutes.

EXAMPLES

The present invention is illustrated more specifically by referring to the following examples.

Production of Inorganic Powder-supported Foaming Agents

The components shown in Table 2 were charged into a mixer (super mixer, supplied by K. K. Kawata, capacity—10 liters), and mixed at 1,440 rpm for 4 minutes to form a mixture. In Comparative Example 2', the mixture was formed by mixing components at 1,500 rpm for 30 minutes using a compression mixer.

Production of Foamed Rubber Blends

The components shown in Table 1 were kneaded by means of a kneader and a roll in a conventional manner to produce a foamed rubber blend.

Production of Foamed Rubber Extruded Products

Each of the resulting foamed rubber blends was extruded using an extruder having a cylinder diameter of 60 mm and a compression ratio of 1.5 at an extrusion rate of 14 m/min or 8 m/min to form an extruded product with a sectional form having a width of 10 mm and a thickness of 3 mm. Subsequently, the resulting extruded product was subjected to UHF vulcanization with an output of 6 kw for 1 min and hot air-vulcanization at 220° C. for 15 minutes, and cut to a length of 100 mm to prepare each test piece (foamed rubber molded product).

Tests for Identifying Effects of the Invention

The above-obtained test pieces were subjected to the following tests.

(1) Specific gravity:

Conducted by a water replacement method according to JIS K 6301.

(2) Low elongation stress ($\sigma_{25}$)

A stress with 25% elongation (Es) was measured according to JIS K 6301.

(3) Surface roughness:

Measured using a surface roughness form measuring device (Surfcom 550A, supplied by Tokyo Seimitsu K.K.).

(4) Extrusion head pressure:

At the time of the above-mentioned extrusion, in Example 1, Comparative Example 2' and Comparative Example 10, the voltage was measured at a screw outlet (side surface) with a load cell, and this voltage was calculated in terms of a pressure. This pressure was defined as an extrusion head pressure.

Test Results

The test results are shown in Tables 2, 3 and 4. From these test results, the following is revealed. In Examples using the inorganic powder-supported foaming agent, the specific gravity is between 0.9 and 1.0, and the surface roughness (RZD) is less than 14 micrometers. Meanwhile, in Comparative Examples, both or one of the specific gravity and the surface roughness is outside the range of the present invention.

In Comparative Examples 1, 2, 2' and 3 in which the particle diameter of the inorganic powder is too large, both of the specific gravity and the surface roughness are outside the ranges of the present invention, although the other requirements are satisfied.

Further, in Comparative Examples 4, 5 and 8 in which the amounts of the foaming agent are too large (inorganic powder-supported foaming agent—8 parts or more, net amounts of the foaming agent—0.8 parts or more), the specific gravity is less than 1.0, which is within the range of the present invention. However, the surface roughness (RZD) is far beyond 14 micrometers, which is outside the range of the present invention.

In Comparative Examples 6 and 7 in which the particle diameters of the pyrolytic foaming agent are too large, the specific gravity and the surface roughness (RZD) exceeds 1.0 and 14 micrometers respectively, which are outside the ranges of the present invention, although the other requirements are satisfied. Naturally, in Comparative Example 8 in which the net amount of the foaming agent (amount of the pyrolytic foaming agent) is too large and the particle diameter of the pyrolytic foaming gent is too large, the surface roughness (RZD) is far beyond 14 micrometers, which is outside the range of the present invention, although the specific gravity is within the range of the present invention.

Further, in Comparative Examples 12 to 17 in which PE is absent or present in a small amount, the specific gravity and the surface roughness (RZD) exceed 1.0 and 14 micrometers respectively, and are both outside the ranges of the present invention, although the other requirements are satisfied.

Figure 1:
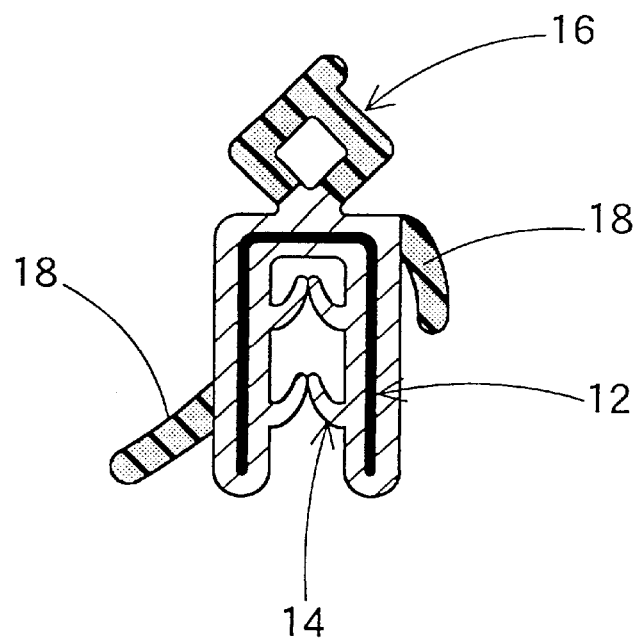
FIG. 1 is a sectional view of a weather strip, an example of a product to which a foamed rubber extruded product of the present invention can be applied.
Figure 2:
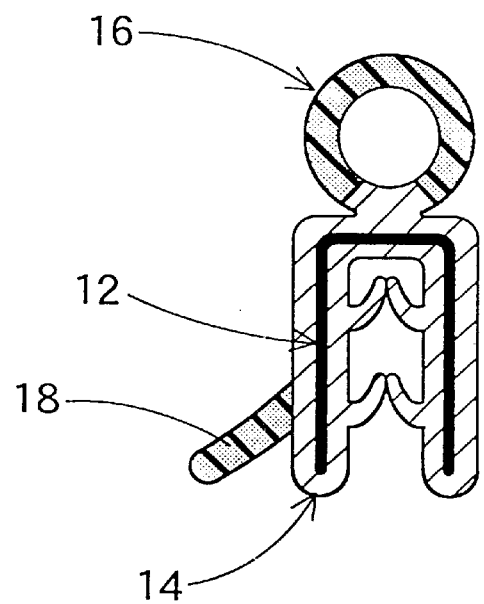
FIG. 2 is a sectional view of a weather strip which is another example thereof.
Figure 3:
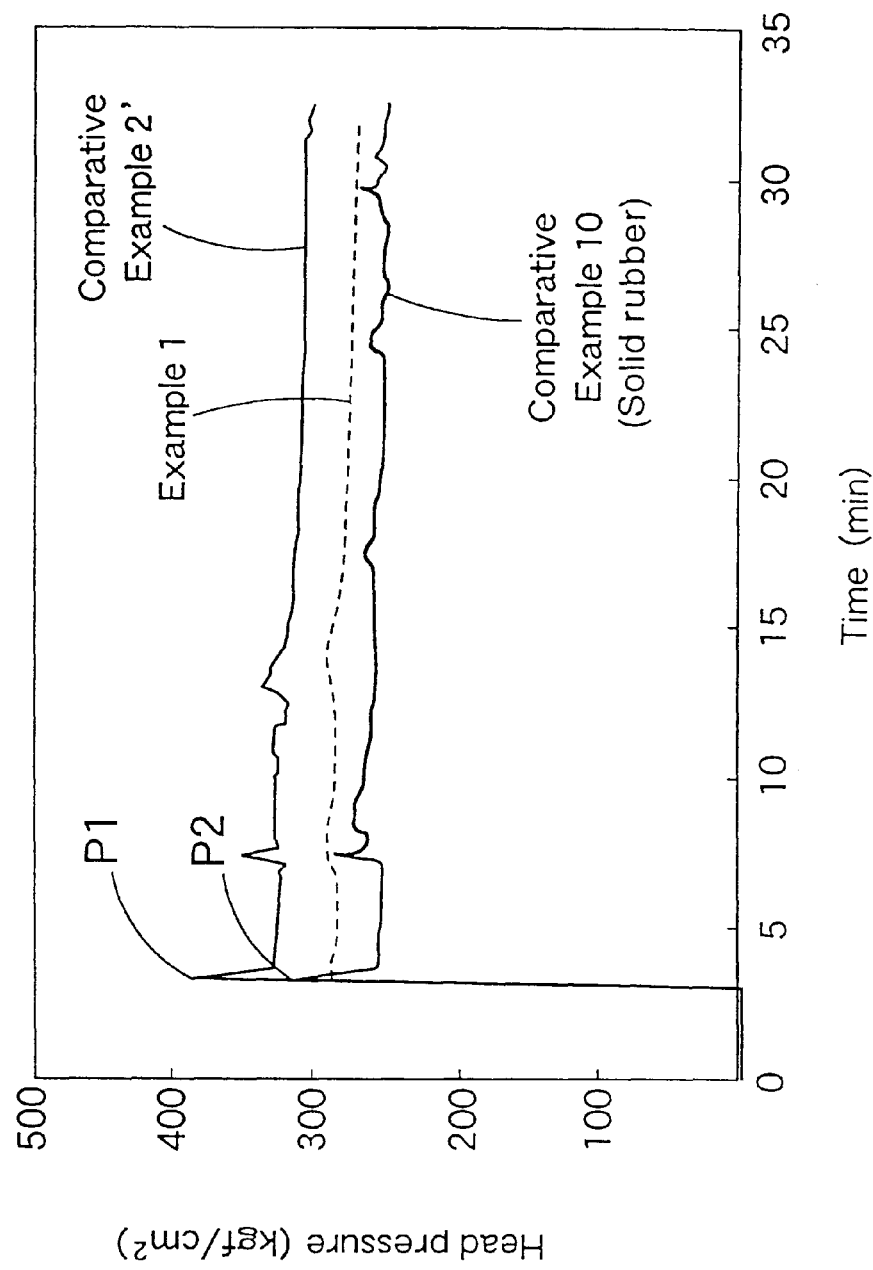
FIG. 3 is a graphical representation showing an extrusion head pressure in each rubber blend.

Further, with respect to the extrusion head pressure, as shown in FIG. 3, it is found that the initial peak values given in Comparative Example 2' having the recipe free from crystalline PE and Comparative Example 10 of the solid rubber are not provided in Example 1 of the present invention.

TABLE 1 unit: parts by weight

|  | Recipe-1 | Recipe-2 | Recipe-3 | Recipe-4 | Recipe-5 |
| --- | --- | --- | --- | --- | --- |
| EPDM polymer (PX-043E) *1 | — | 110 | 110 | 110 | 110 |
| EPDM polymer (PX-043PE) *2 | 130 | — | — | — | — |
| FEF carbon black | 140 | 140 | 140 | 140 | 140 |
| Process oil (paraffin type) | 80 | 80 | 80 | 80 | 80 |
| Zinc oxide | 5 | 5 | 5 | 5 | 5 |
| Stearic acid | 1 | 1 | 1 | 1 | 1 |
| Dehydrating agent (CaO) | 5 | 5 | 5 | 5 | 5 |
| Filler (calcium carbonate) | 25 | 25 | 25 | 25 | 25 |
| Vulcanization accelerator | 7 | 7 | 7 | 7 | 7 |
| Sulfur | 2 | 2 | 2 | 2 | 2 |
| Foaming agent or inorganic powder-suppordted foaming agent | as shown in Table 2 | as shown in Table 2 | as shown in Table 2 | as shown in Table 2 | as shown in Table 2 |
| PE *3 | (20) | 20 | 10 | 5 | 0 |

*1 supplied by Mitsi Kagaku K.K. (ethylene content: 72%, iodine value: 12, third component: ethylidene norbornene) oil-extended (paraffine type, including 10 parts)
*2 brend polymer alloy containing 20 parts of polyethylene (average particle diameter or dispersed particles: 0.01 $\mu$m or less) oil-extended (paraffine type, including 10 parts)
*3 density: 0.921 g/cm$^3$, melting point: 103~122° C.

TABLE 2

| | Inorganic powder-supported foaming agent | | | | | | |
| --- | --- | --- | --- | --- | --- | --- | --- |
| | Inorganic powder | Foaming agent | (%) | Amount (parts) | Specific gravity | low elongation stress (kPa) | Surface roughness ($R_{ZD}$) | Recipe |
| Example 1 | Finely divided talc (0.4 $\mu$m) | OBSH-1 | 10 | 3 | 0.948 | 764 | 10.4 | 1 |
| Example 2 | ↑ | ↑ | ↑ | 1 | 0.971 | 779 | 10.1 | 1 |
| Example 3 | ↑ | ↑ | ↑ | 5 | 0.932 | 743 | 11.2 | 1 |
| Example 4 | ↑ | ↑ | ↑ | 3 | 0.924 | 728 | 12.5 | 1 |
| Example 5 | Light calcium carbonate-1 (1.0 $\mu$m) | ↑ | ↑ | 3 | 0.953 | 760 | 11.0 | 1 |
| Example 6 | Light calcium carbonate-2 (1.8 $\mu$m) | ↑ | ↑ | 3 | 0.939 | 738 | 11.3 | 1 |
| Example 7 | Heavy calcium carbonate-1 (5.0 $\mu$m) | ↑ | ↑ | 3 | 0.959 | 726 | 11.9 | 1 |
| Example 8 | ↑ | ↑ | ↑ | 5 | 0.935 | 712 | 12.3 | 1 |
| Example 9 | Finely divided talc (0.4 $\mu$m) | ↑ | 20 | 2 | 0.950 | 767 | 10.8 | 1 |
| Example 10 | ↑ | ↑ | 10 | 3 | 0.954 | 763 | 10.7 | 2 |

OBSH-1 (average particle diameter: 4 $\mu$m)
Extrusion rate: 14 m/min (8 m/min in Example 4)

TABLE 3

Inorganic powder-supported foaming agent

|  | Inorganic powder | Foaming agent | (%) | Amount (parts) | Specific gravity | low elongation stress (kPa) | Surface roughness ($R_{ZD}$) | Recipe |
|---|---|---|---|---|---|---|---|---|
| Comparative Example 1 | Heavy calcium carbonate-2 (13.0 μm) | OBSH-1 | 10 | 3 | 1.051 | 780 | 14.8 | 1 |
| Comparative Example 2 | Siliceous earth (20~40 μm) | ↑ | ↑ | 3 | 1.103 | 791 | 15.6 | 1 |
| Comparative Example 2' | ↑ | ↑ | ↑ | 5 | 1.071 | 564 | 16.3 | 5 |
| Comparative Example 3 | ↑ | ↑ | ↑ | 1 | 1.110 | 809 | 15.0 | 1 |
| Comparative Example 4 | Heavy calcium carbonate-1 (5.0 μm) | ↑ | ↑ | 8 | 0.923 | 779 | 18.6 | 1 |
| Comparative Example 5 | Finely divided talc (0.4 μm) | ↑ | ↑ | 8 | 0.938 | 741 | 19.3 | 1 |
| Comparative Example 6 | ↑ | OBSH-2 | ↑ | 1 | 1.109 | 801 | 18.8 | 1 |
| Comparative Example 7 | ↑ | ↑ | ↑ | 5 | 1.003 | 783 | 19.3 | 1 |
| Comparative Example 8 | ↑ | ↑ | ↑ | 8 | 0.922 | 740 | 21.9 | 1 |
| Comparative Example 9 | — | OBSH-1 | — | 0.3 | 1.109 | 764 | 9.1 | 1 |
| Comparative Example 10 | — | — | — | — | 1.120 | 693 | 6.0 | 1 |
| Comparative Example 11 | Finely divided talc (0.4 μm) | ADCA | 10 | 3 | 1.036 | 480 | 18.9 | 1 |

OBSH-1 (average particle diameter: 4 μm)
OBSH-2 (average particle diameter: 11 μm)
ADCA (average particle diameter: 5 μm)
Extrusion rate: 14 m/min

TABLE 4

Inorganic powder-supported foaming agent

|  | Inorganic powder | Foaming agent | (%) | Amount (parts) | Specific gravity | low elongation stress (kPa) | Surface roughness ($R_{ZD}$) | Recipe |
|---|---|---|---|---|---|---|---|---|
| Example 11 | Finely divided talc (0.4 μm) | OBSH-1 | 10 | 3 | 0.993 | 563 | 13.6 | 3 |
| Example 12 | Light calcium carbonate-1 (1.0 μm) | ↑ | ↑ | 3 | 0.990 | 568 | 13.9 | 3 |
| Example 13 | Heavy calcium carbonate-3 (3.3 μm) | ↑ | ↑ | 3 | 0.987 | 554 | 13.7 | 3 |
| Comparative Example 12 | ↑ | ↑ | ↑ | 3 | 1.052 | 447 | 15.9 | 5 |
| Comparative Example 13 | Finely divided talc (0.4 μm) | ↑ | ↑ | 3 | 1.036 | 429 | 15.8 | 5 |
| Comparative Example 14 | Light calcium carbonate-1 (1.0 μm) | ↑ | ↑ | 3 | 1.083 | 579 | 17.1 | 5 |
| Comparative Example 15 | Heavy calcium carbonate-3 (3.3 μm) | ↑ | ↑ | 3 | 1.087 | 582 | 16.8 | 5 |
| Comparative Example 16 | Finely divided talc (0.4 μm) | ↑ | ↑ | 3 | 1.096 | 468 | 15.3 | 4 |

OBSH-1 (average particle diameter: 4 μm)
Extrusion rate: 14 m/min (5 m/min in Comparative Example 12)

What is claimed is:

1. A foamed rubber extruded product which is formed of a vulcanizate of a rubber blend comprising a sulfur-vulcanziable ethylene-propylene-type rubber (EPDM) as a starting rubber and a pyrolytic foaming agent, the vulcanizate having a specific gravity of form 0.9 to 1.0 and a surface roughness (RZD) of 14 micrometers or less, wherein the rubber blend contains the pryolytic foaming agent in the form of an inorganic powder-supported foaming agent, a particle diameter of the inorganic powder in the inorganic powder-supported foaming agent is approximately 9 micrometers or less, a particle diameter of the pyrolytic foaming agent is approximately 8 micrometers or less, and crystalline polyethylene (crystalline PE) is further contained in an amount of from 6 to 30 parts by weight per 100 parts by weight of EPDM.

2. The foamed rubber extruded product of claim 1, wherein the amount of said crystalline PE is between 8 and 25 parts by weight.

3. The foamed rubber extruded product of claim 2, wherein the amount of the pyrolytic foaming agent (functional amount of the foaming agent) is at least 0.05 parts by weight and less than 0.7 parts by weight per 100 parts by weight of EPDM.

4. The foamed rubber extruded product of claim 3, wherein the pyrolysis temperature of the pyrolytic foaming agent is between 150 and 170° C.

5. The foamed rubber extruded product of claim 1, wherein the amount of the pyrolytic foaming agent (functional amount of the foaming agent) is at least 0.05 parts by weight and less than 0.7 parts by weight per 100 parts by weight of EPDM.

6. The foamed rubber extruded product of claim 5, wherein the pyrolysis temperature of the pyrolytic foaming agent is between 150 and 170° C.

7. A process for producing a foamed rubber extruded product having a specific gravity of from 0.9 to 1.0 and a surface roughness (RZD) of 14 micrometers or less, comprising the steps of:

extruding a rubber blend comprising EPDM as a starting rubber and a pyrolytic foaming agent; and vulcanizing said rubber blend, wherein the rubber blend contains the pyrolytic foaming agent in the form of an inorganic powder-supported foaming agent, a particle diameter of the inorganic powder in the inorganic powder-supported foaming agent is approximately 9 micrometers or less, crystalline PE is further contained in an amount of form 6 to 30 parts by weight per 100 parts by weight of EPDM, and the extrusion rate is between 8 and 24 m/min or more.

8. The process of claim 7, wherein the amount of crystalline PE is between 8 and 25 parts by weight per 100 parts by weight of EPDM.

9. The process of claim 8, wherein the amount of the pyrolytic foaming agent (functional amount of the foaming agent) is at least 0.05 parts by weight and less than 0.7 parts by weight per 100 parts by weight of EPDM.

10. The process of claim 9, wherein the pyrolysis temperature of the pyrolytic foaming agent is between 150 and 170° C.

11. The process of claim 8, wherein said extrusion rate is between 12 and 16 m/min.

12. The process of claim 7, wherein the amount of the pyrolytic foaming agent (functional amount of the foaming agent) is at least 0.05 parts by weight and less than 0.7 parts by weight per 100 parts by weight of EPDM.

13. The process of claim 12, wherein the pryolysis temperature of the pyrolytic foaming agent is between 150 and 170° C.

14. The process of claim 7, wherein said extrusion rate is between 12 and 16 m/min.

* * * * *